United States Patent [19]

Diery et al.

[11] 4,440,902
[45] Apr. 3, 1984

[54] BISESTERS OF ALKENYLSUCCINIC ACIDS AND ETHYLENE OXIDE/PROPYLENE OXIDE BLOCK POLYMERS AND THEIR USE

[75] Inventors: Helmut Diery, Kelkheim, Fed. Rep. of Germany; Bernhard Mees, Charlotte, N.C.

[73] Assignee: Hoechst Aktiengesellschaft, Fed. Rep. of Germany

[21] Appl. No.: 416,100

[22] Filed: Sep. 9, 1982

[30] Foreign Application Priority Data

Sep. 12, 1981 [DE] Fed. Rep. of Germany ....... 3136213

[51] Int. Cl.³ ...................... C08F 283/06; C08L 71/02
[52] U.S. Cl. ..................................... 525/404; 525/408
[58] Field of Search ................. 525/404, 408; 524/111

[56] References Cited

U.S. PATENT DOCUMENTS 3,213,054 10/1965 Prill et al. ........................... 524/111

FOREIGN PATENT DOCUMENTS 2540173 9/1975 Fed. Rep. of Germany ...... 525/408

Primary Examiner—Theodore Morris
Assistant Examiner—Robert Sellers
Attorney, Agent, or Firm—Connolly and Hutz

[57] ABSTRACT

New bisesters of alkenylsuccinic acids and ethylene oxide/propylene oxide block polymers, which are obtained by reaction of alkenylsuccinic anhydride of the Formula 1

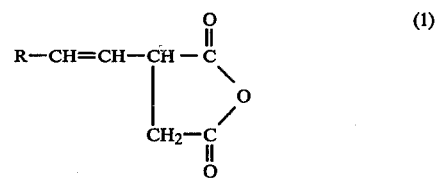

wherein R denotes branched or unbranched $C_2$–$C_{20}$ alkyl, with an ethylene oxide/propylene oxide block polymer of the Formula 2

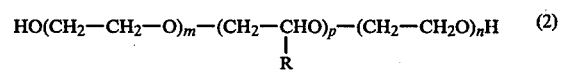

wherein R denotes methyl or ethyl, n and m are numbers selected such that the polyethylene oxide contribution to the total molecule is 5 to 80% of the molecular weight and p is a number from 10 to 70, and their use as demulsifiers for oil-water emulsions, as corrosion-protective agents and as dispersants for dyestuffs.

2 Claims, No Drawings

BISESTERS OF ALKENYLSUCCINIC ACIDS AND ETHYLENE OXIDE/PROPYLENE OXIDE BLOCK POLYMERS AND THEIR USE

Derivatives of alkenylsuccinic acids are auxiliaries having valuable properties and diverse areas of use. They are obtained by reaction of α-olefins with maleic anhydride at temperatures of about 200° C. The alkenylsuccinic anhydrides thus obtained can then be further derivatized by reactions known per se. Thus, for example, they can be hydrolyzed with potassium hydroxide to give the potassium salt, which is employed as a solubilizing agent for liquid cleaning agents. Alkenylsuccinic anhydrides can be converted into the triethanolammonium salt, which exhibits good corrosion-protective properties. Likewise, reactions of alkenylsuccinic anhydrides with fatty alcohols to give the corresponding esters are known, which esters are employed as lubricants.

Thus, in all these derivatives, alkenylsuccinic anhydrides are reacted with low molecular weight compounds.

The present invention now describes novel reaction products of alkenylsuccinic acids or anhydrides.

The invention relates to new bisesters of alkenylsuccinic acids and ethylene oxide/propylene oxide block polymers, which are obtained by a reaction of alkenylsuccinic anhydrides of the formula 1

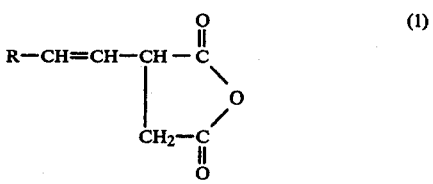

wherein R denotes branched or unbranched $C_{20}-C_{20}$ alkyl, with an ethylene oxide/propylene oxide block polymer of the formula 2

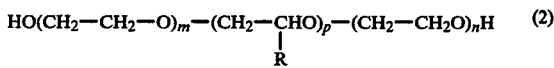

wherein R denotes methyl or ethyl, n and m are numbers selected such that the polyethylene oxide contribution to the total molecule is 5 to 80% of the molecular weight and p is a number from 10 to 70.

As has already been mentioned, the alkenyl succinic anhydrides are obtained by reaction of α-olefins with maleic anhydride at temperatures of 200° C. It is equally possible to start from the free acid instead of the alkenylsuccinic anhydride of the formula 1 above. The lower α-olefins, such as butene, pentene, hexene etc., must be reacted in an autoclave, while the higher olefins, from hexadecene upwards, can be reacted in an open vessel. Apart from linear α-olefins, branched α-olefins can also be employed for the reaction, such as, for example, tripropylene (i-nonene) or tertrapropylene (i-dodecene).

The products employed as the ethylene oxide/propylene oxide block polymers are those prepared by oxyethylation of a polypropylene oxide having a molecular weight of at least 600. Preferably, the starting material is a polypropylene oxide having a molecular weight of 1,000 to 3,500. The propylene oxide can also be partly replaced by butylene oxide. The contribution of the polyethylene oxide groups to the total molecule of the block polymer is selected such that it is at least 5%, preferably 10–80%.

The reaction of the alkenylsuccinic anhydrides with the ethylene oxide/propylene oxide block polymers is carried out in two steps. The first step, that is to say the monoesterification, is carried out at temperatures of 50°–100° C., preferably 80°–120° C. The second step, that is to say the esterification of the free carboxylic acid with OH groups of the block polymer which are still free, crosslinking occurring, is carried out at temperatures of 160°–260° C., preferably temperatures of 190°–240° C.

The molar ratio of the alkenylsuccinic anhydride to the block polymer is about 1:1 as a rule, but deviations in the direction of 0.5:1 are possible and desirable in particular cases. The esterification is carried out such that the anhydride and the block polymer are initially introduced and are heated together, with stirring, to a high temperature. Since, in the second step, water must be removed by distillation, it is advisable to carry out this esterification under a gentle stream of nitrogen, since the removal of the water is thus made easier. The reaction is continued until an acid number below 7 results.

The products thus obtained are very suitable as breakers of emulsions of water and crude petroleum, as corrosion-protective agents and as dispersants of dyestuffs.

The following examples are intended to illustrate the invention, but without restricting it.

EXAMPLE 1

287 parts by weight of a block polymer with a polypropylene oxide block of molecular weight 1,750 and 40% of polyethylene oxide in the total molecule (commercial name ®Pluriol PE 6,400) and 21.2 parts by weight of i-nonenylsuccinic anhydride were placed in a 1 liter vessel having an anchor agitator, internal thermometer and short-path distillation head, and heated to 90° C. This temperature was maintained for 4 hours and then increased further to 240° C. The reaction was then allowed to continue for 18 hours at this temperature, the water of reaction being removed by distillation by applying a gentle stream of nitrogen. When an acid number of <7 was reached, the mixture was cooled down. A viscous brown liquid was obtained.

EXAMPLE 2

The process was carried out in accordance with Example 1, but instead of i-nonenylsuccinic anhydride, 15.4 parts by weight of n-butenylsuccinic anhydride were employed. After 4 hours at 80° C., the mixture was maintained at 240° for a further 16 hours, the resulting acid number in the final product being 6.

EXAMPLE 3

400 parts by weight of a block polymer with a polypropylene oxide block having a molecular weight of 1,750 and 80% of polyethylene oxide in the total molecule (®Pluriol PE 6,800) and 10 parts by weight of n-octenylsuccinic anhydride were mixed in a 1 liter stirred vessel, equipped as in Example 1, and monoesterification was initially carried out at 90° in 3 hours. The second step of esterification was carried out at 200° C. in 7 hours. The acid number was then 6. The viscous brown product had a cloud point of 97° C.

EXAMPLE 4

230 parts by weight of a block polymer with a polypropylene oxide block having a molecular weight of 950 and a polyethylene oxide contribution of 10% in the total molecule (®Pluriol PE 3,100), together with 50 parts by weight of i-dodecenylsuccinic anhydride, were esterified in a 1 liter stirred vessel according to Example 1. After 25 hours at 220°, an acid number of 7 was reached. The product could still be poured and had a light brown colour.

EXAMPLE 5 288 parts by weight of a block polymer with a polypropylene oxide block having a molecular weight of 1,750 and a polyethylene oxide contribution of 40% in the total molecule (®Pluriol PE 6,800), together with 40 parts by weight of n-hexadecenylsuccinic anhydride, were esterified in a 1 liter stirred vessel according to Example 1. After 16 hours at 230° C., the acid number of the very viscous brown liquid was 6.8.

We claim:

1. A bisester of alkenylsuccinic acid and an ethylene oxide/propylene oxide block polymer, obtained by reaction of alkenylsuccinic anhydride of the Formula 1

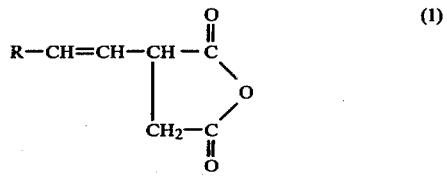

wherein R denotes branched or unbranched $C_2$–$C_{20}$ alkyl, with an ethylene oxide/propylene oxide block polymer of the Formula 2

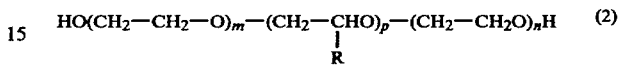

wherein R denotes methyl or ethyl, n and m are numbers selected such that the polyethylene oxide contribution to the total molecule of the block polymer is 5 to 80% of the molecular weight and p is a number from 10 to 70.

2. The use of the bisester as claimed in claim 1 as a demulsifier for oil-water emulsions, as a corrosion protective agent and as a dispersant for dyestuffs.

* * * * *